(12) United States Patent
Neel et al.

(10) Patent No.: US 12,250,560 B2
(45) Date of Patent: Mar. 11, 2025

(54) SYSTEMS AND METHODS FOR IDENTIFYING AND SHARING AIRBORNE RADAR SPECTRUM

(71) Applicant: Federated Wireless, Inc., Arlington, VA (US)

(72) Inventors: James Neel, Lynchburg, VA (US); Kurt Schaubach, Arlington, VA (US)

(73) Assignee: FEDERATED WIRELESS, INC., Arlington, VA (US)

( * ) Notice: Subject to any disclaimer, the term of this patent is extended or adjusted under 35 U.S.C. 154(b) by 696 days.

(21) Appl. No.: 17/191,618

(22) Filed: Mar. 3, 2021

(65) Prior Publication Data

US 2024/0137773 A1 Apr. 25, 2024

Related U.S. Application Data

(60) Provisional application No. 62/984,640, filed on Mar. 3, 2020.

(51) Int. Cl.
*H04W 16/14* (2009.01)
*H04W 4/021* (2018.01)

(52) U.S. Cl.
CPC ............ *H04W 16/14* (2013.01); *H04W 4/021* (2013.01)

(58) Field of Classification Search
CPC ..... H04W 16/14; H04W 72/50; H04W 4/025; H04W 72/12; G01S 7/023
See application file for complete search history.

(56) References Cited

U.S. PATENT DOCUMENTS

| | | | |
|---|---|---|---|
| 11,194,052 B1* | 12/2021 | Kazmierczak | ........ G01S 19/215 |
| 2009/0222226 A1* | 9/2009 | Baraniuk | ............ H03M 13/11 |
| | | | 702/66 |

(Continued)

OTHER PUBLICATIONS

H. Li, W. D. Jin, H. D. Liu and T. W. Chen, "Work mode identification of airborne phased array radar based on the combination of multi-level modeling and deep learning," 2016 35th Chinese Control Conference (CCC), Chengdu, China, 2016, pp. 7005-7010, doi: 10.1109/ChiCC.2016.7554461. (Year: 2016).*

(Continued)

*Primary Examiner* — Vladimir Magloire
*Assistant Examiner* — Noah Yi Min Zhu
(74) *Attorney, Agent, or Firm* — Finnegan, Henderson, Farabow, Garrett & Dunner, LLP

(57) ABSTRACT

Systems and methods for identifying shareable airborne radar spectrum are disclosed. The system may include an Airborne Radar Sensing Capability (AR-SC) system that performs a method including: receiving, from a sensor, information indicative of an active airborne radar, the information comprising at least: an identification of the sensor; determining one or more frequencies affected by the active airborne radar; and determining whether the active airborne radar is associated with a specific aircraft; if the active airborne radar is associated with a specific aircraft: determining a location of the aircraft; and reporting, to a spectrum controller, (i) the one or more affected frequencies, and (ii) the location of the aircraft; if the active airborne radar is not associated with a specific aircraft: reporting, to a spectrum controller, the one or more affected frequencies.

33 Claims, 3 Drawing Sheets

(56) References Cited

U.S. PATENT DOCUMENTS

| | | | | |
|---|---|---|---|---|
| 2014/0179336 | A1* | 6/2014 | Steer | H04W 16/14 |
| | | | | 455/456.1 |
| 2015/0223069 | A1* | 8/2015 | Solondz | H04W 12/08 |
| | | | | 370/329 |
| 2015/0346722 | A1* | 12/2015 | Herz | G01S 19/13 |
| | | | | 701/2 |
| 2016/0337868 | A1* | 11/2016 | Kenney | H04W 72/0453 |
| 2017/0195887 | A1* | 7/2017 | Jovancevic | H04W 4/021 |
| 2017/0303333 | A1* | 10/2017 | Zhao | H04W 36/0011 |
| 2017/0347961 | A1* | 12/2017 | Perraut | A61B 5/6893 |
| 2018/0059213 | A1* | 3/2018 | Wallstedt | H04K 3/226 |
| 2019/0357077 | A1* | 11/2019 | Baker | G08G 5/0078 |
| 2020/0103499 | A1* | 4/2020 | Preece | G01S 13/867 |
| 2020/0312159 | A1* | 10/2020 | Hegranes | H04B 7/18506 |
| 2021/0058146 | A1* | 2/2021 | Eichen | H04B 7/1851 |
| 2021/0132182 | A1* | 5/2021 | Srinivas | G01S 5/0226 |
| 2021/0321327 | A1* | 10/2021 | Miranda | H04W 48/04 |

OTHER PUBLICATIONS

S. Haykin, W. Stehwien, C. Deng, P. Weber and R. Mann, "Classification of radar clutter in an air traffic control environment," in Proceedings of the IEEE, vol. 79, No. 6, pp. 742-772, Jun. 1991, doi: 10.1109/5.90155. (Year: 1991).*

* cited by examiner

SYSTEMS AND METHODS FOR IDENTIFYING AND SHARING AIRBORNE RADAR SPECTRUM

CROSS-REFERENCE TO RELATED APPLICATIONS

This application claims the benefit of U.S. Provisional Application Ser. No. 62/984,640, filed on Mar. 3, 2020, the disclosure of which is hereby incorporated by reference in its entirety.

TECHNICAL FIELD

The present disclosure relates to techniques for maintaining a distributed Spectrum Access System (SAS) and, more particularly, cloud-based methods, systems, and computer-readable media for identifying sharable airborne radar spectrum resources and sharing such spectrum.

BACKGROUND

Radio frequency (RF) spectrum is the foundation for many wireless communications systems in use today, including radar and cellular communications systems. Specified frequency ranges, sometimes identified as bands or channels, in the RF spectrum may be allocated for use by different entities, for different purposes, or in different geographic locations. As used in this disclosure, "spectrum" refers to any frequencies, frequency bands, and frequency channels in the RF spectrum that may be used or allocated for wireless communications.

Because the available RF spectrum is finite, frequency allocations in the spectrum are highly valued and often highly regulated. In the United States, for example, the Federal Communications Commission (FCC) and the National Telecommunication and Information Administration (NTIA) regulate and manage spectrum allocations, allotments, and assignments. Frequency allocation is the process by which the entire RF spectrum is divided into frequency bands established for particular types of service. These frequency allocations are then further subdivided into channels designated for a particular service or "allotment." Assignment refers to the final subdivision of the spectrum in which a party (i.e., cellular operator) receives one or more frequency assignments, in the form of a license, to operate a radio transmitter on specific frequency channels within a particular geographic location.

In view of the increasing demand for spectrum, a dynamic spectrum access (DSA) system may be used to share available spectrum among multiple users. A DSA system, for example, may include a Spectrum Access System (SAS) that manages access to a shared spectrum, such as the Citizens' Band Radio Service (CBRS) band at 3.5 GHz, which was recently made available for terrestrial commercial use in the U.S. In another example, a DSA system may be used to share access to unlicensed spectrum, such as Television Whitespace (TVWS). Coordinating and managing multi-user access to a shared spectrum present challenges in a DSA system.

Conventionally, the SAS can also provide radio channel maps or spectrum availability maps to a network node. A network node may be any device configured to communicate over the network, including for example, any type of user equipment (such as mobile devices, computers, smartphones, tablets, laptops, etc.), access points, servers, routers, switches, gateways, or other computing devices connected to the network. However, conventional techniques for providing radio channel maps or spectrum availability maps suffer several shortcomings. For example, conventional radio channel maps or spectrum availability maps that networks can provide connectivity on generally refer to static maps showing spectrum availability (e.g., licensed spectrum) across a geographical area. Such static maps of spectrum availability may be tied to geographical locations, such as census tracts, and are not tied to access points (APs) near the location. Accordingly, such static maps of spectrum availability may not necessarily reflect the dynamic availability of spectrum or connectivity options that are available to the APs. As used herein, one or more APs may include one or more radios where each radio may be assigned to a separate frequency and controlled separately. As used herein, the terms AP and radio may be substituted for one another.

In some cases, the actual availability of spectrum or connectivity options for APs may dynamically change due to dynamic protection of "incumbent users," such as satellite ground stations, military or other government users, that were assigned the spectrum before that spectrum was shared with other "non-incumbent" users. Incumbent users may be protected by the Dynamic Protection Area (DPA) in the CBRS band. As used herein, a "user" may refer to a user equipment (such as a mobile phone) or to a person using a user equipment as will be apparent in context. In addition, the actual availability of spectrum or connectivity options for APs may dynamically change due to dynamic spectrum use by higher-priority spectrum users, "primary users" in shared bands, or by "secondary users" such as Priority Access License (PAL) users in the CBRS band. Moreover, the actual availability of spectrum or connectivity options for APs may dynamically change due to coexistence reasons, such as managed reallocation of spectrum to mitigate inter-radio interference. While the actual availability of spectrum or connectivity options for APs may be dynamically changing, dynamic availability of spectrum is not reflected in static spectrum availability or channel maps.

However, this system of spectrum allocation, allotment, and assignment is failing to keep pace with the increasing demand for spectrum. There is, therefore, a need to improve how the available spectrum can be efficiently allocated, allotted, and assigned in the face of growing demand. In particular, there is a need to allow access to spectrum that has heretofore been "off limits" to non-incumbent users. For example, the U.S. government is currently considering proposals to share spectrum in the range of 3.1 GHz to 3.55 GHz, currently used by military airborne radar systems operated by the Department of Defense (DoD). Because of their advantaged position (altitude), rapidly changing location, and potential to operate anywhere in the U.S., such airborne radars present unique challenges that have not been addressed by existing CBRS sharing techniques.

Moreover, there is a fundamental tension between the DoD's need to maintain operational security (OPSEC) and optimal spectrum-sharing. When operational details of protected DoD system are known more precisely, more efficient spectrums-sharing techniques may be used. However, the DoD, by its nature, must be able to conduct some of its missions in secrecy, and disseminating knowledge of aircraft locations, even with a very coarse granularity, could compromise the success of a mission. This need to maintain OPSEC has also not been addressed by existing sharing techniques.

SUMMARY

One aspect of the present disclosure is directed to a method for identifying shareable airborne radar spectrum.

The method may include: receiving, from one or more sensors, information indicative of an active airborne radar; receiving, from one or more receivers, information indicative of a platform of the active airborne radar; determining one or more frequencies affected by the active airborne radar; determining, based on the information indicative of the platform of the active airborne radar, a location associated with the one or more affected frequencies; and reporting, to a spectrum controller, (i) the one or more affected frequencies, and (ii) the location.

Another aspect of the present disclosure is directed to a method for identifying shareable airborne radar spectrum. The method may include: receiving, from a sensor, information indicative of an active airborne radar, the information comprising at least: an identification of the sensor; determining one or more frequencies affected by the active airborne radar; and determining whether the active airborne radar is associated with a specific aircraft; if the active airborne radar is associated with a specific aircraft: determining a location of the aircraft; and reporting, to a spectrum controller, (i) the one or more affected frequencies, and (ii) the location of the aircraft; if the active airborne radar is not associated with a specific aircraft: reporting, to a spectrum controller, the one or more affected frequencies.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this disclosure, illustrate various exemplary disclosed embodiments. In the drawings.

DETAILED DESCRIPTION

Figure 1:
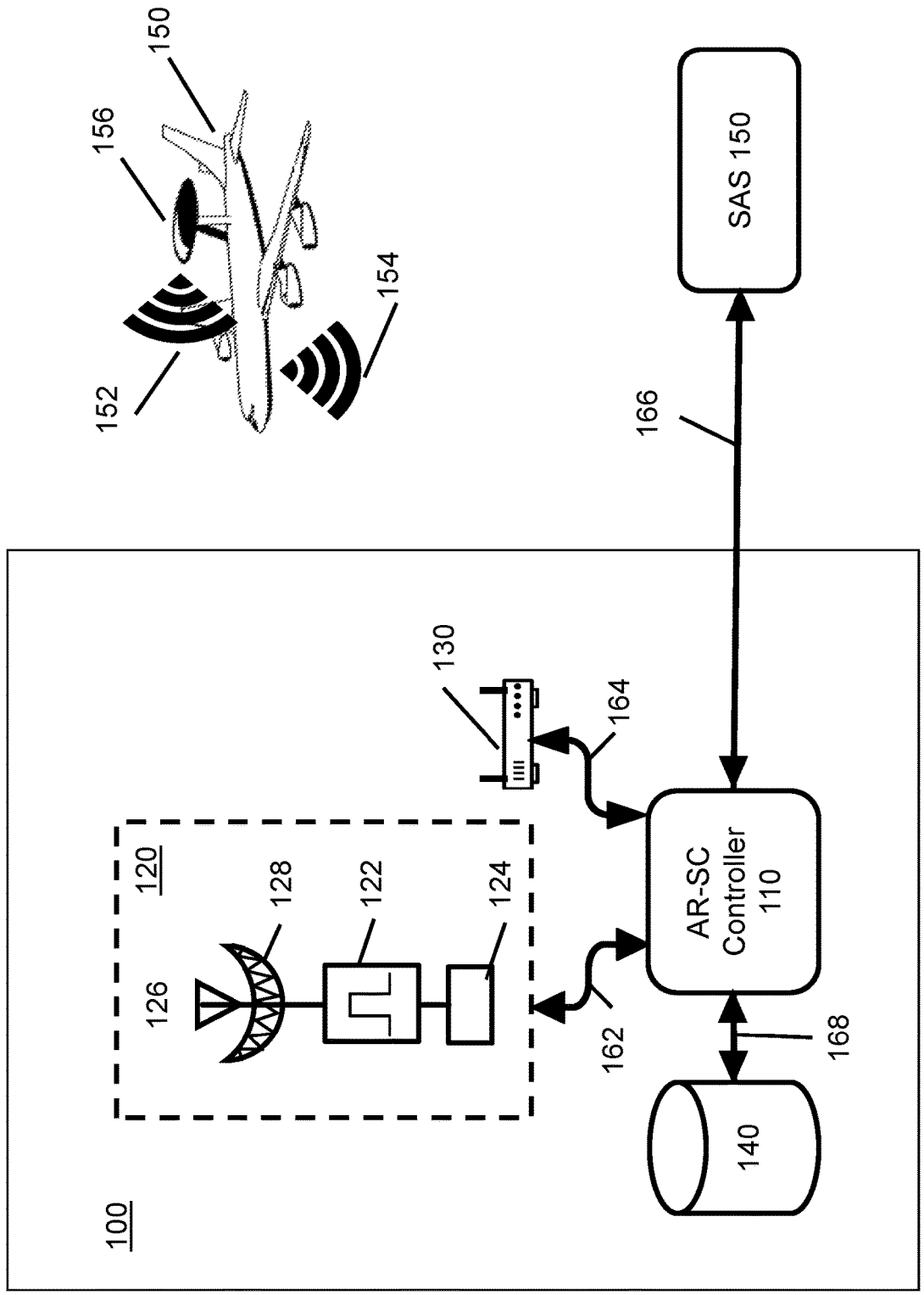
FIG. 1 is a schematic diagram illustrating an exemplary Airborne Radar Sensing Capability (AR-SC) system for identifying and sharing shareable airborne radar spectrum, in accordance with certain disclosed embodiments.

The following detailed description refers to the accompanying drawings. Wherever possible, the same reference numbers are used in the drawings and the following description to refer to the same or similar parts.

FIG. 1 is a schematic diagram illustrating an exemplary Airborne Radar Sensing Capability (AR-SC) system 100 for identifying and sharing shareable airborne radar spectrum, in accordance with certain disclosed embodiments. As illustrated in FIG. 1, AR-SC system 100 may include an AR-SC controller 110 operatively connected to an airborne radar detector 120, an aircraft identification sensor 130, a data store 140, and a spectrum access system (SAS) 150.

In some embodiments, each of the components of the AR-SC system 100 illustrated FIG. 1 may represent a group of systems, individual systems in a network of systems, functional units or modules inside a system, or any combination thereof. Thus, although FIG. 1 illustrates a simple AR-SC system 100 comprising a single AR-SC controller 110 operatively connected to a single airborne radar detector 120, aircraft identification sensor 130, and SAS 150, it will be understood that AR-SC system 100 may include one or more AR-SC controller(s) 110, operatively connected to one or more airborne radar detector(s) 120, one or more aircraft identification sensor(s) 130, and one or more SAS(s) 150. Moreover, the individual components may be located within one geographical location or be geographically dispersed.

AR-SC controller 110 may be implemented using a variety of computerized and cloud-based systems, which may be connected to each other via one or more networks. For example, AR-SC controller 110 may take the form of a server, general-purpose computer, mainframe computer, special-purpose computing device such as a graphical processing unit (GPU), laptop, or any combination of such computing devices. In some embodiments, the functional units of AR-SC controller 110 may be distributed across several computing devices operatively connected within system 100. Alternatively, AR-SC controller 100 may be implemented as a standalone system, or as a subsystem that is part of a larger system.

As discussed below in connection with FIG. 3, AR-SC controller 110 may perform one or more methods for identifying and sharing sharable airborne radar spectrum associated with an airborne radar platform, such as aircraft 150 operating radar 156. In performing such methods, AR-SC controller 110 may receive input from and provide output to airborne radar detector 120, aircraft identification sensor 130, data store 140, and SAS 150. Accordingly, airborne radar detector 120, aircraft identification sensor 130, data store 140, and SAS 150 may each be operatively connected to AR-SC controller via one or more electronic communications interfaces 162, 164, 166, 168. Interfaces 162, 164, 166, and 168 may each be implemented, e.g., using wired and/or wireless communication interfaces, such as an RF communications interface, an optical communications interface, an analog communications interface, a digital communications interface, a wide-area network (WAN) interface, a local area network (LAN) interface, and/or an Internet communications interface.

Data store 140 may be configured to store data and/or software required by AR-SC controller 110, airborne radar detector 120, aircraft identification sensor 130, and/or SAS 150 to perform one or more of the methods described in the present disclosure. For example, data store 140 may store a database correlating certain characteristics of specific radar signals 152 with the types of radar 156 known to use such signals and/or the types of aircraft (or specific aircraft) 150 known to use such types of radar 156 (or radar signals 152). Although illustrated as a single data store 140 directly linked to AR-SC controller 110, it is to be understood that, in some embodiments, data store 140 may be implemented using multiple distributed data stores, e.g., using cloud-based storage, accessible to one or more of AR-SC controller 110, airborne radar detector 120, aircraft identification sensor 130, and/or SAS 150. Alternatively, one or more of AR-SC controller 110, airborne radar detector 120, aircraft identification sensor 130, and/or SAS 150 may maintain separate or locally shared data stores 140.

Airborne radar detector 120 may be implemented using any of a variety of RF sensors or detectors. In some embodiments, airborne radar detector 120 may be implemented using an electronic sensor configured to sense RF signals in one or more frequency bands used by airborne radar systems, such as radar 156. In some embodiments, airborne radar detector 120 may be implemented by an extended Citizens Broadband Radio Service (CBRS) Environmental Sensing Capability (ESC) sensor configured to sense transmissions 154 from the ADS-B transponder or airborne radar signals 152 emitted, e.g., by radar system 156 of aircraft 150. For example, airborne radar detector 120 may be configured to detect signals in a frequency range of 3.1 GHz to 4.2 GHz.

In other embodiments, airborne radar detector 120 may be configured to detect signals in a frequency range of 3.1 GHz-3.55 GHz and/or 3.7-4.2 GHz. However, it should be understood that the methods and systems of the present disclosure are not limited to any specific frequency bands and may be applied to other bands in the RF spectrum.

In some embodiments, frequencies outside of the desired range may be excluded, e.g., by a bandpass filter 122 or digital filter 124. In some embodiments, digital filter 124 may include, for example, pulse and/or chirp filters configured to discriminate relevant airborne radar signals from other signals in the passed frequency range based on one or more characteristics of the relevant airborne radar signals. In some embodiments, airborne radar detector 120 may include an antenna 126 that is configured to exclude or minimize detection of terrestrial signals, e.g., by appropriate shielding 128 or appropriate selection and orientation of the antenna's directivity.

Aircraft identification sensor 130 may be implemented using any of a variety of RF sensors or detectors. In some embodiments, aircraft identification sensor 130 may be implemented using an electronic sensor configured to sense identification signals 154 broadcast by aircraft 150. In some embodiments, aircraft identification sensor 130 may be implemented by an Automatic Dependent Surveillance-Broadcast (ADS-B) Out Receiver configured to sense ADS-B Out signals broadcast by aircraft 150.

The aircraft identification signal 154 may encode, e.g., information identifying the specific aircraft 150, and/or the type, the location, the altitude, the velocity, and/or the direction or heading of aircraft 150. For example, aircraft identification signal 154 may identify the location and altitude of aircraft 150 using Global Positioning System (GPS) coordinates. In some embodiments, the aircraft identification signal 154 may be updated with a predetermined frequency, e.g., 1/sec, so as to provide intermittent updates of the aircraft's location, etc.

In some embodiments, aircraft identification sensor 130 may decode the relevant information from aircraft identification signal 154 and transmit the raw data (e.g., raw ADS-B Out data) to AR-SC controller 110. In other embodiments, aircraft identification sensor 130 may reformat and/or interpret the raw data and transmit the reformatted and/or interpreted data to AR-SC controller 110. For example, aircraft identification sensor 130 may decode the relevant information from aircraft identification signal 154 to determine the present GPS coordinates, velocity, and/or heading of aircraft 150 and transmit this information to AR-SC controller 110 in an appropriately formatted analog or digital electronic signal. In some embodiments, aircraft identification sensor 130 may estimate the location of aircraft 150 within about 300 meters. In some embodiments, aircraft identification sensor 130 may perform a filtering algorithm (e.g., a Kalman filtering algorithm) to estimate of the location of aircraft 150 between updates, based on several prior location updates. In some embodiments, aircraft identification sensor 130 may estimate the location of aircraft 150 using a pattern-of-life analysis based on location data and/or flight plan information collected during prior flights of the specific aircraft 150 and/or other aircraft of the same similar type and stored within data store 140 or other accessible database.

Figure 2:
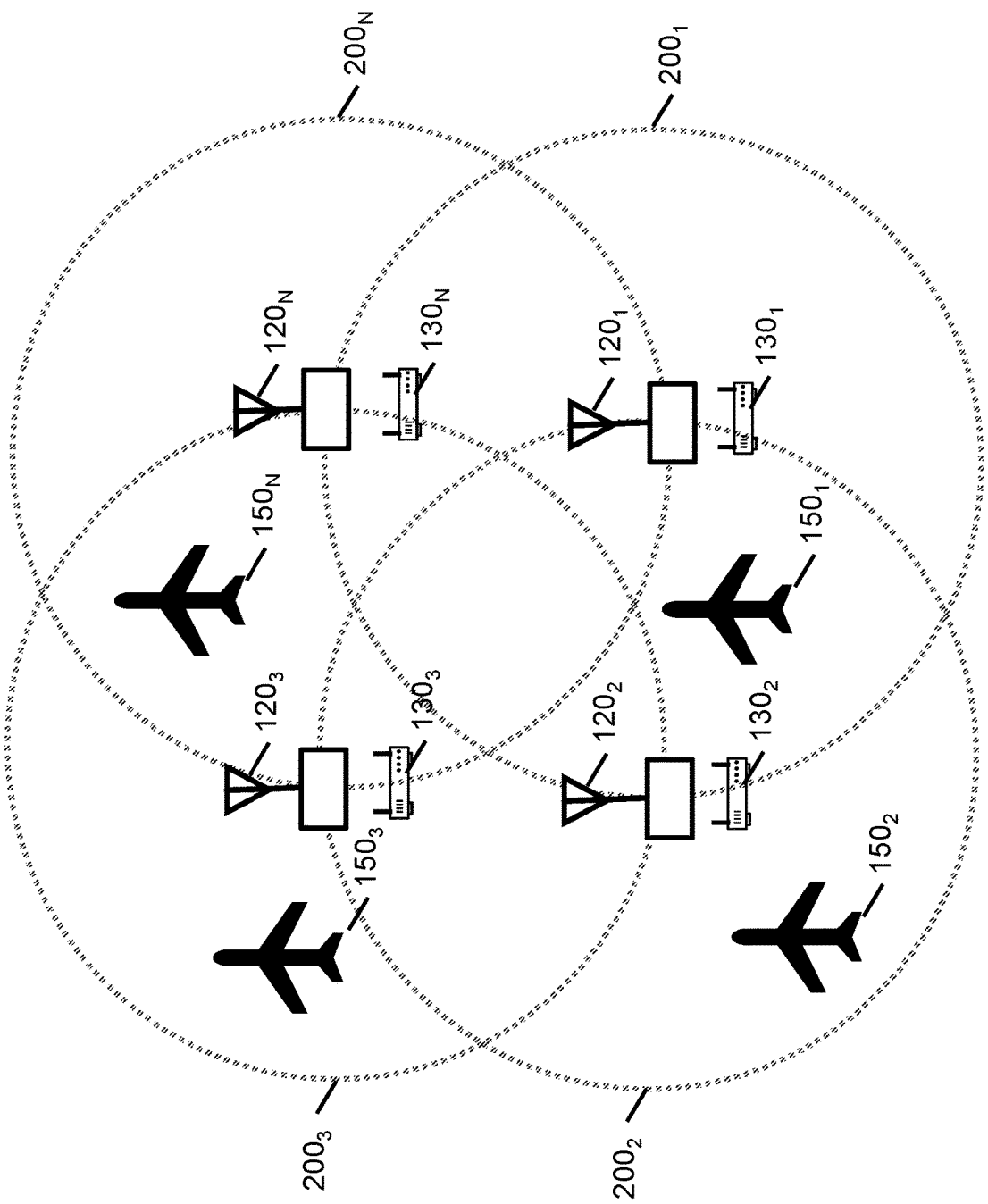
FIG. 2 is a schematic diagram illustrating an exemplary arrangement of airborne radar detectors and/or aircraft identification sensors in the AR-SC system of FIG. 1.

As shown in FIG. 2, AR-SC system 100 may include a plurality of airborne radar detectors $120_{1-N}$ covering partially overlapping regions $200_{1-N}$ of a given geographical area, and/or a plurality of aircraft identification sensors $130_{1-N}$ covering the same partially overlapping regions $200_{1-N}$. Here, it is to be understood that, although airborne radar detectors $120_{1-N}$ are illustrated as being co-located with corresponding aircraft identification sensors $130_{1-N}$ and covering the same partially overlapping regions $200_{1-N}$, this need not be the case. In some embodiments, such overlapping coverage may allow AR-SC control system to identify (e.g., with reference to correlated data in data store 140) which of a plurality of candidate aircraft $150_{1-N}$ should be associated with a given radar signal 152 and ADS-B transponder identification signal 154. In some embodiments, airborne radar detectors $120_{1-N}$ may determine whether the strength and/or signal-to-noise ratio of the sensed radar signal 152 is above a given threshold and ignore signals below the threshold and/or exclude such signals from further processing and identification.

SAS 150 may be implemented using a variety of computerized and cloud-based systems, which may be connected to each other via one or more networks. For example, SAS 150 may take the form of a server, general-purpose computer, mainframe computer, special-purpose computing device such as a graphical processing unit (GPU), laptop, or any combination of such computing devices. In some embodiments, the functional units of SAS 150 may be distributed across several computing devices operatively connected within system 100. Alternatively, SAS 150 may be implemented as a standalone system, or as a subsystem that is part of a larger system. As discussed below in connection with FIG. 3, SAS 150 may perform one or more algorithms to allocate and/or de-allocate spectrum to non-incumbent users based on input from AR-SC controller 110.

Figure 3:
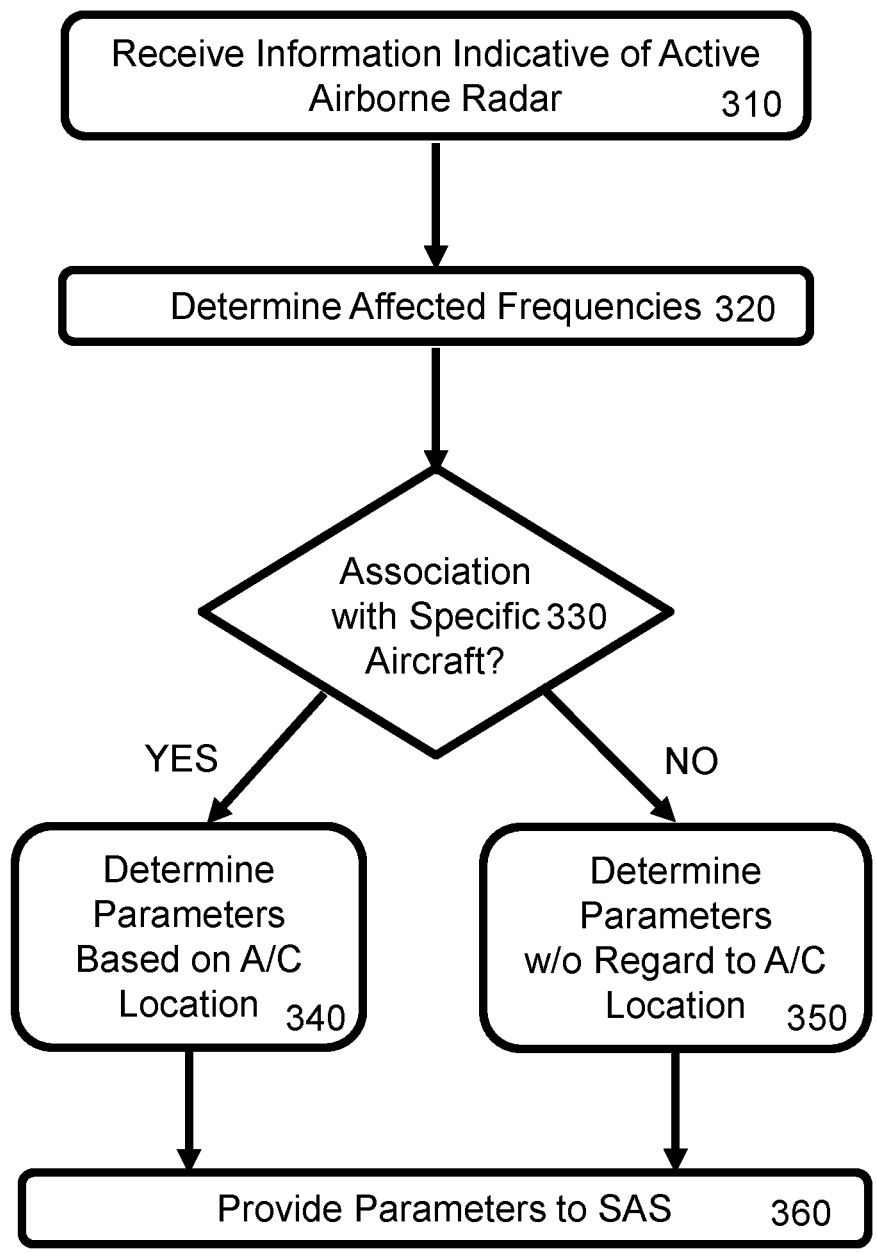
FIG. 3 depicts a flowchart illustrating an exemplary method for identifying shareable airborne radar spectrum in accordance with certain disclosed embodiments.

FIG. 3 is a flowchart illustrating an exemplary method 300 for identifying shareable airborne radar spectrum in accordance with certain disclosed embodiments. Method 300 may be implemented utilizing AR-SC system 100 as described above, including AR-SC controller 110. However, although method 300 is described below with reference to AR-SC system 100 of FIG. 1, it will be understood that method 300 may alternatively be performed by any other suitable system or subsystem, including by AR-SC controller 110.

In Step 310 of method 300, AR-SC controller 110 receives, from one or more sensors, information indicative of an active airborne radar 156. For example, AR-SC controller may receive input from one or more airborne radar detectors $120_{1-N}$ indicating that a radar signal 152 from an active airborne radar 156 has been detected within their respective coverage areas. In some embodiments, each radar detector $120_{1-N}$ that detects the active radar signal 152 may send AR-SC controller 110 an analog or digital message indicating that an active airborne radar has been detected. The message may indicate, e.g., the received signal strength and other characteristics of the detected radar signal, as described below. In some embodiments, the message may include an identification of the individual sensor $120_{1-N}$, e.g., by GPS coordinates, serial number, or other identifier.

In some embodiments, airborne radar detector 120 may be configured to identify with reference to correlated data in data store 140, the active airborne radar based on one or more characteristics of the radar signal 152. For example, airborne radar detector 120 may be configured to identify a type of the active airborne radar (e.g., airborne early warning (AEW), airborne ground surveillance (AGS), target acquisition (TA), etc.) and/or a specific radar system (e.g., by their multi-service classification codes according to the Joint Electronics Type Designation System) based on one or more characteristics of the radar signal. For example, the type of radar or specific radar may be identified based on, e.g., the frequencies and/or frequency bands used by the radar, a pulse repetition frequency (PRF) of the radar, a duty cycle of the radar, a pulse train of the radar, a spectrum profile of the radar, etc. In some embodiments, airborne radar detector 120 may identify the active airborne radar 156 using a machine learning algorithm trained to identify various airborne radar systems based on such characteristics.

In some embodiments, AR-SC controller 110 may identify the active airborne radar 156 based on raw data received from airborne radar detector 120 and/or aircraft identification sensor 130. For example, AR-SC controller 110 may identify an airborne radar signal detected by airborne radar detector 120 based on the specific aircraft (or type of aircraft) identified by aircraft identification sensor 130, e.g., by correlating (with reference to correlated data in data store 140) one or more characteristics of the radar signal with the radar(s) known to be used by the identified aircraft (or type).

Alternatively, in order to maintain OPSEC, the specific radar system may not be identified. Instead, airborne radar detector 120 may determine, based on such characteristics, whether the detected radar signal 152 is a protected incumbent within the controlled spectrum, and classify the radar signal as "protected" or "unprotected," without explicitly identifying the specific radar or type of radar. In some embodiments, airborne radar detector 120 may classify the active airborne radar 156 using a machine learning algorithm trained to identify protected airborne radar systems based on such characteristics. In some embodiments, AR-SC controller 110 may classify the active airborne radar based on raw data received from airborne radar detector 120, with reference to correlated data in data store 140.

In Step 320, AR-SC controller may determine one or more frequencies (or frequency bands) affected by the active airborne radar. In some embodiments, AR-SC controller 110 may identify the affected frequencies based on the frequencies that are known to be used by a specific radar system 156 identified in Step 310, without regard to whether they are presently being used by the detected radar signal 152. In the case of a frequency-hopping radar, for example, AR-SC controller may identify, with reference to correlated data in data store 140, some or all of the frequencies known to be used by the identified radar system 156 as being affected. In some embodiments, AR-SC controller 110 may identify only the frequencies actually being used by the detected radar signal 152 as being affected, e.g., based on raw data received from airborne radar detector 120 identifying the detected frequencies. In some embodiments, AR-SC controller 110 may identify a predetermined bandwidth around the detected frequencies as being affected, regardless of whether such bandwidth is currently used by the identified radar system 156. For example, AR-SC controller may identify a band of +5 MHz around the frequencies actually used or useable by the detected radar system 156 as being affected. In some embodiments, AR-SC controller 110 may also identify harmonics of the frequencies actually used or useable by the detected radar system 156 as being affected.

In Step 330, AR-SC controller may determine whether the active airborne radar 156 may be associated with a specific aircraft 150. For example, AR-SC controller 110 may determine whether aircraft identification sensor 130 has identified a specific aircraft 150 that may be correlated with the detected radar signal 152. Assuming, for example, that airborne radar detector 120₁ in FIG. 2 has identified an active airborne radar 156₁, AR-SC controller 110 may first determine whether any of the aircraft identification sensors 130₁₋ₙ within a predetermined radius of airborne radar detector 120₁ has identified an aircraft 150, e.g., based on the detection of aircraft ADS-B identification signal 154. The predetermined radius may be determined based, e.g., on a known detectable range of the identified radar system 156. If an aircraft 150 has been identified within such a radius, AR-SC 110 may determine, with reference to data store 140, whether the identified aircraft 150 may be correlated with the detected radar signal 152 or identified radar system 156.

For example, if the identified aircraft 150 is of a type known to use the detected radar signal 152 or identified radar system 156, then AR-SC controller may correlate the identified aircraft 150 with the detected radar signal 152 or identified radar system 156. By contrast, if the identified aircraft 150 is of a type not known to use the detected radar signal 152 or identified radar system 156, then AR-SC controller may exclude the identified aircraft 150 as a source of the detected radar signal 152 and continue to consider whether other detected aircraft 150 may be the source of the detected radar signal 152. In some embodiments, AR-SC controller may compare data from multiple, overlapping airborne radar detectors 120₁₋ₙ and aircraft identification sensors 130₁₋ₙ to determine which of several candidate aircraft 150₁₋ₙ is the source of a detected radar signal 152.

If the active airborne radar has been associated with a specific aircraft (Step 330: YES), then AR-SC controller 110 may determine the parameters of a Dynamic Protected Area (DPA), based around the specific aircraft 150, within which non-incumbent users are to be prevented from using the affected frequencies (Step 340). In some embodiments, the parameters of the DPA may include, at least, an identification of the affected frequencies and the location of the aircraft 150.

In some embodiments, the location of the aircraft may be identified as a static location corresponding to the last know location of the aircraft 150 (e.g., based on GPS coordinates encoded in aircraft identification signal 154). In some embodiments, the location of the aircraft 150 may be updated at predetermined intervals, based on corresponding updates to the aircraft identification signal 154 (e.g., 1/sec in the case of an ADS-B Out transponder signal). Alternatively, the location of the aircraft 150 may be identified as being within a predetermined radius of the last known location. For example, the radius may be determined based on the last known heading, speed, and/or altitude of the aircraft 150. In some embodiments, the location of the aircraft 150 may be identified as being within a predetermined radius of a predicted flight path of the aircraft 150. For example, the flight path may be predicted based on the last known heading, speed, and/or altitude of the aircraft 150. In some embodiments, the flight path may be predicted based on a flight plan associated with the aircraft 150, e.g., within data store 140 or other accessible database.

If the active airborne radar has not been associated with a specific aircraft (Step 330: NO), then AR-SC controller 110 may determine the parameters of a DPA, within which non-incumbent users are to be prevented from using the affected frequencies, without regard to the location of the aircraft (Step 350). In some embodiments, the parameters of the DPA may include, at least, an identification of the affected frequencies.

In Step 360, AR-SC controller may provide the parameters of the DPA to SAS 150, so that SAS may de-allocate radio spectrum within the DPA, such that non-incumbent users are prevented from using the affected frequencies and/or frequency bands within a given area. For example, AR-SC controller 10 may provide the parameters of the DPA to SAS 150 in an appropriately formatted analog or digital electronic signal via interface 166.

In some embodiments, the DPA may be defined with a given duration and/or set expiration time. For example, the given duration and/or set expiration time may be set based on the predicted use of the affected spectrum by the active airborne radar 156. In some embodiments, the duration of the expected use of the affected spectrum may be based, e.g., on a pattern-of-life analysis of information on past uses of the affected spectrum by the specific aircraft 150 and/or other aircraft of the same similar type and stored within data store 140 or other accessible database. In some embodiments, the DPA may be set to expire after a predetermined interval, based on the interval at which the aircraft identification signal 154 is expected to provide an update to the location of aircraft 150 (e.g., 1/sec in the case of an ADS-B Out transponder signal). Alternatively, the DPA may be set to remain in force until rescinded by AR-SC controller 110.

In some embodiments, the DPA may extend over a fixed location. In other embodiments, the DPA may be defined as a moveable geo-fence, with a given trajectory. For example, the moveable geo-fence may be defined to follow a predicted flight path of the aircraft 150. In some embodiments, the flight path may be predicted based on the last known heading, speed, and/or altitude of the aircraft 150. In some embodiments, the flight path may be predicted based on a flight plan associated with the aircraft 150, e.g., within data store 140 or other accessible database. In some embodiments, the flight path may be predicted using a pattern-of-life analysis based on location data and/or flight plan information collected during prior flights of the specific aircraft 150 and/or other aircraft of the same similar type and stored within data store 140 or other accessible database. In some embodiments, the moveable geo-fence may be defined to exclude non-incumbent transmissions within a predetermined extent of the predicted flight path of the aircraft 150, so as to provide a margin for error in the prediction. In some embodiments, the moveable geo-fence may be defined as sphere centered on the aircraft 150 as it moves along its actual or predicted flight path. In some embodiments, the radius of the sphere may be defined based on one or more of the signal strength of the potential secondary users, the signal strength of the airborne radar 156, and/or the noise sensitivity of the airborne radar 156.

Systems and methods consistent with the disclosed embodiments allow spectrum that may be intermittently occupied by airborne radar signals 152 to be shared by non-incumbent users, while maintaining operational security for DoD and other government uses. During routine non-sensitive operations (e.g., airborne radar training and platform repositioning), DoD aircraft may broadcast their position using the ADS-B system so that AR-SC controller 110 may maintain precise awareness of the location of aircraft 150 and the spectrum that may be affected by radar signals 152 emitted by airborne radar 156. During classified or sensitive operations, DoD aircraft may not broadcast their position using the ADS-B system so that AR-SC controller 110 has no awareness of the location of the DoD aircraft, beyond the presence of a protected signal. Accordingly, the disclosed systems and methods allow airborne radar spectrum to be shared with high efficiency, without compromising the security of sensitive or classified operations, and without conflict between incumbent and non-incumbent users.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. For example, the exemplary disclosed embodiments are described in terms of interference-to-noise power contours, although those skilled in the art will appreciate that other criteria, such as signal-to-noise or carrier-to-noise ratios, compared to a threshold value may be used to determine the contours for incumbent users consistent with the disclosed embodiments herein. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps, performing steps in parallel, and/or inserting or deleting steps. It is intended, therefore, that the specification and examples be considered as illustrative only, with a true scope and spirit being indicated by the following claims and their full scope of equivalents.

What is claimed is:

1. A method for identifying shareable airborne radar spectrum, comprising:
   receiving, from one or more sensors, information indicative of an active airborne radar;
   determining, based on a machine learning algorithm, a type of the active airborne radar based on characteristics associated with a type of radar;
   receiving, from one or more receivers, information indicative of a platform of the active airborne radar;
   determining one or more frequencies affected by the active airborne radar;
   determining, based on the information indicative of the platform of the active airborne radar, a location associated with the one or more affected frequencies, wherein the information indicative of the platform of the active airborne radar comprises at least one of a velocity or a direction associated with an aircraft;
   associating the location associated with the one or more frequencies as a moveable geo-fence, wherein the moveable geofence is a sphere centered on the aircraft; and
   reporting, to a spectrum controller, (i) the one or more affected frequencies, and (ii) the location.

2. The method of claim 1, wherein the information indicative of the platform of the active airborne radar further comprises:
   a location associated with an aircraft.

3. The method of claim 1, wherein determining the location associated with the one or more affected frequencies comprises:
   using at least one of the position, velocity, or direction to calculate a future location associated with the one or more affected frequencies.

4. The method of claim 1, wherein determining the location associated with the one or more affected frequencies includes correlating, by an automated learning method, an association of the information indicative of the active airborne radar and the information indicative of the platform of the active airborne radar.

5. The method of claim 4, wherein the automated learning method comprises successive filtering across one or more observed events.

6. The method of claim 4, wherein the automated learning method comprises machine learning.

7. The method of claim 4, wherein the automated learning method comprises a pattern of life analysis.

8. The method of claim 1, wherein determining the location associated with the one or more affected frequencies includes receiving, from a government agency, the location.

9. The method of claim 1, wherein determining the location associated with the one or more affected frequencies includes estimating a future motion of an aircraft.

10. The method of claim 9, wherein estimating the future motion includes calculating the future motion based on the information indicative of the platform of the active airborne radar.

11. The method of claim 9, wherein estimating the future motion includes predicting the future motion from one or more previous motions associated with the aircraft.

12. The method of claim 11 further comprising:
storing the one or more previous motions associated with the aircraft in a database.

13. The method of claim 1, wherein the one or more sensors are configured have overlapping coverage regions.

14. The method of claim 1, wherein the sensor is an RF sensor.

15. The method of claim 14, wherein the RF sensor includes at least one of: (i) a pulse filter, and (ii) a chirp filter.

16. The method of claim 1, wherein the information indicative of the platform of the active airborne radar is Automatic Dependent Surveillance-Broadcast (ADS-B) data.

17. The method of claim 1, wherein determining the location associated with the one or more affected frequencies comprises:
receiving information from an Automatic Dependent Surveillance-Broadcast (ADS-B) aircraft transponder;
determining the location of the aircraft based on the ADS-B information; and
determining the location associated with the one or more affected frequencies based on the location of the aircraft.

18. A method for identifying shareable airborne radar spectrum, comprising:
receiving, from a sensor, information indicative of an active airborne radar, the information comprising at least:
an identification of the sensor;
determining one or more frequencies affected by the active airborne radar;
determining, based on a machine learning algorithm, a type of the active airborne radar based on characteristics associated with a type of radar; and
determining whether the active airborne radar is associated with a specific aircraft, wherein the information indicative of the platform of the active airborne radar further comprises at least one of a velocity or a direction associated with the specific aircraft;
associating a location associated with the one or more frequencies as a moveable geo-fence, wherein the moveable geofence is a sphere centered on the aircraft;
if the active airborne radar is associated with a specific aircraft:
determining a location of the aircraft; and
reporting, to a spectrum controller, (i) the one or more affected frequencies, and (ii) the location of the aircraft;
if the active airborne radar is not associated with a specific aircraft:
reporting, to a spectrum controller, the one or more affected frequencies.

19. The method of claim 18, wherein the sensor is an RF sensor.

20. The method of claim 19, wherein the RF sensor is configured to sense RF signals having a frequency between 3.1 GHZ and 4.2 GHz.

21. The method of claim 19, wherein the RF sensor includes at least one of: (i) a pulse filter, and (ii) a chirp filter.

22. The method of claim 18, wherein the identification of the sensor includes at least one of:
(i) a location of the sensor, or
(ii) a sensor identifier.

23. The method of claim 18, wherein the information indicative of an active airborne radar includes an identification of at least one of;
(i) a type of the active airborne radar,
(ii) one or more frequencies used by the active airborne radar,
(iii) one or more frequency bands used by the active airborne radar,
(iv) a type of aircraft, or
(v) a specific aircraft.

24. The method of claim 18, wherein determining one or more frequencies affected by the active airborne radar comprises:
receiving an identification of a type of the active airborne radar; and
determining the one or more affected frequencies affected by the identified type of the active airborne radar.

25. The method of claim 18, wherein determining one or more frequencies affected by the active airborne radar comprises:
receiving an identification of one or more frequencies used by the active airborne radar; and
determining the one or more affected frequencies based on the one or more identified frequencies used by the active airborne radar.

26. The method of claim 18, wherein determining one or more frequencies affected by the active airborne radar comprises:
receiving an identification of one or more frequency bands used by the active airborne radar; and
determining the one or more affected frequencies based on the one or more identified frequency bands.

27. The method of claim 18, wherein determining one or more frequencies affected by the active airborne radar comprises:
receiving an identification of a type of aircraft; and
determining the one or more affected frequencies based on the identified type of aircraft.

28. The method of claim 18, wherein determining one or more frequencies affected by the active airborne radar comprises:
receiving an identification of a specific aircraft; and
determining the one or more affected frequencies based on the identified specific aircraft.

29. The method of claim 18, wherein determining whether the active airborne radar is associated with a specific aircraft comprises:
receiving an identification of a specific aircraft associated with the active airborne radar.

30. The method of claim 29, wherein receiving an identification of a specific aircraft associated with the active airborne radar comprises:
receiving information from an Automatic Dependent Surveillance-Broadcast (ADS-B) output by the specific aircraft; and identifying the specific aircraft based on the ADS-B information.

31. The method of claim 18, wherein determining a location of the aircraft comprises:
receiving information from an Automatic Dependent Surveillance-Broadcast (ADS-B) output by the specific aircraft; and
determining the location of the aircraft based on the ADS-B information.

32. The method of claim 18, wherein reporting, to a spectrum controller, the one or more affected frequencies, comprises reporting at least one of:
(i) a type of the active airborne radar,
(ii) one or more frequencies used by the active airborne radar,
(iii) one or more frequency bands used by the active airborne radar,
(iv) a type of aircraft, or
(v) a specific aircraft.

33. The method of claim 18, wherein reporting, to a spectrum controller, the location of the aircraft comprises:
receiving location information from an Automatic Dependent Surveillance-Broadcast (ADS-B) output by the specific aircraft; and
reporting the location of the aircraft based on the ADS-B location information.

* * * * *